May 3, 1960     W. R. BERTELSEN ET AL     2,935,107
CUTTING BOARD
Filed Aug. 28, 1957
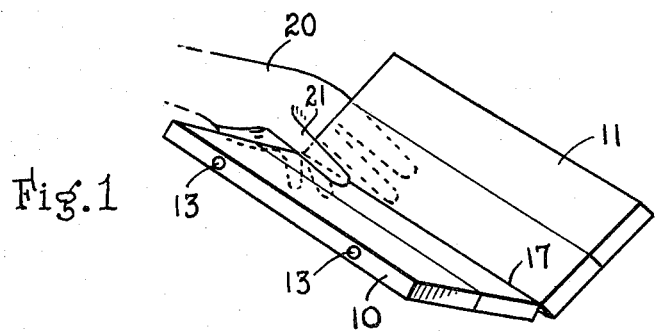
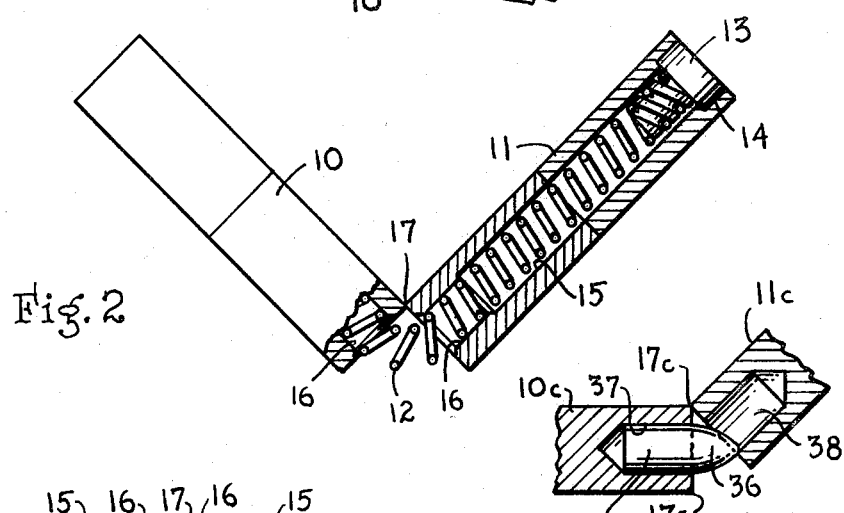
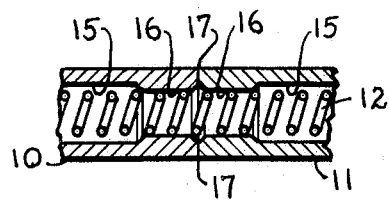
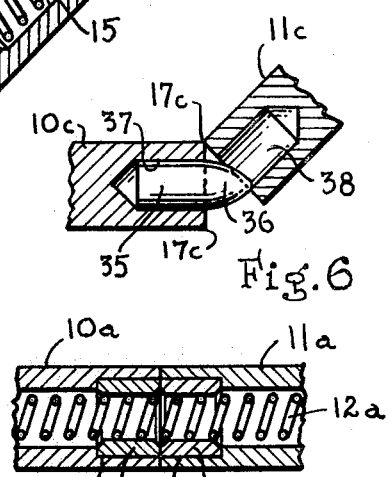
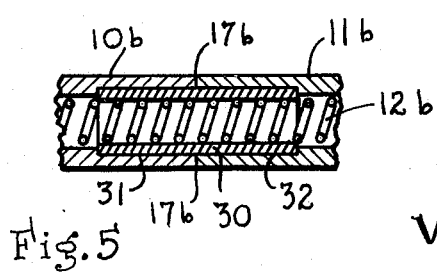
Alberta M. Bertelsen
William R. Bertelsen
INVENTORS

2,935,107
CUTTING BOARD

William R. Bertelsen and Alberta M. Bertelsen, Neponset, Ill.

Application August 28, 1957, Serial No. 680,709

3 Claims. (Cl. 146—215)

The present invention relates to cutting board, and more specifically to a cutting board having at least two parts providing a cutting surface, which portions are hinged together by a yieldable connection whereby the surface may be bent conveniently around contiguous portions to form a trough for directing the path of travel of cut up items off the cutting board.

It is, therefore, an object of this invention to provide an improved cutting board formed so that contiguous portions can be bent to form a trough.

It is a more specific object hereof to provide a cutting board with yieldable hinged assembly structure permitting at least one normally planar portion to be manually rendered non-planar.

Other objects and advantages reside in details of construction and arrangement of parts, and will be either obvious or pointed out in the following specification and claims interpreted in view of the accompanying drawing, in which;

Fig. 1 is a perspective view of one form of the invention,

Fig. 2 is an end view of Fig. 1 with parts broken away to show the assembly thereof, Fig. 3 is a view of parts of the center portion of Fig. 2 showing the parts in the normal position of assembly, Figs. 4 and 5 are views similar to Fig. 3 but showing modifications; and Fig. 6 is a detail view of a guide dowel.

Referring first to Figs. 1, 2 and 3, the cutting board is made up of at least two parts 10 and 11. As shown in the drawing, each of these parts may comprise two constituent parts, or more, if so desired. The parts 10 and 11 are made preferably of hard wood such as maple, for example, although many different woods or plastics could be used in the manner disclosed herein. The parts 10 and 11 are secured together by yieldable means, here shown as springs 12 threaded for securement at the ends by threaded plugs 13. The plugs 13, one at either end of a spring 12, seat in shouldered counter-bores provided in the ends of holes 15 that pass through the parts 10 and 11. The abutting inner ends of the holes 15 are preferably of reduced diameter as at 16 to closely fit the spring 12 to thereby provide a good hinge about the line 17 of abutment of the parts 10 and 11.

The springs 12 are in tension to hold the parts together while permitting relative rotation thereof by the hand 20, the thumb 21 of which may conveniently be placed over the top of the line 17, the first and second fingers beneath the part 11 and the third and fourth fingers beneath the part 10. Then squeezing together of the fingers toward the thumb will cause the cutting board to bend about the line 17 into the position shown in Figs. 1 and 2. Release of pressure will permit the springs 12 to return the parts to the position shown in Fig. 3. It is to be noted that the upper or lower cutting surfaces may be used. Thus the structure provides a pair of lines 17 to prolong the useful life of the cutting board in the manner described herein.

In normal use the board is placed on a surface and fruits, vegetables, nuts, and the like, cut or chopped, during which many portions of same may scatter to different parts of the surfaces of the parts 10 and 11. After cutting is completed the parts 10 and 11 are bent into the position shown in Fig. 1 with the lowermost point of the line 17 over a receptacle. Shaking or tapping of the board will then cause the chopped items to move downward toward the center and end of the board and into the receptacle.

In Fig. 4, parts 10a and 11a are secured together by a spring 12a. Hard inserts 25 and 26 are secured in suitable counterbores 27 and 28 respectively of parts 10a and 11a to form a hinge in cooperation with the spring 12a. Such structure permits the use of relatively soft wood for parts 10a and 11a, with hard wood, metal or plastic for the inserts 25 and 26 to provide long life.

In Fig. 5, parts 10b and 11b are secured by a spring 12b which cooperates with a flexible sleeve 30 to form a hinge.

The sleeve 30 may be of semi-hard rubber or suitably flexible plastic and is slideably mounted in at least one of the counterbores 31 and 32 in parts 10b and 11b respectively. Such structure permits use of soft wood for parts 10b and 11b, if desired, while still providing a long useful life for the cutting board. In addition the insert tube 30 provides a hinge that closely maintains a line contact along the lines 17b.

Fig. 6 shows a dowel 35 inserted in part 10c and having an end 36 with its surface curved about lines 17c. The dowel 35 may be fitted either into a hole 37 in the part 10c or in an identical hole in the part 11c while still retaining the function of maintaining the lines of contact 17c. This structure can be used in any of the above described modifications but finds particular utility in those structures shown in Figs. 1 through 4. Any suitable number of dowels, as desired, may be placed so as to clear the springs.

While different modifications of the present invention have been shown, and described in some detail, obviously still others will occur to those skilled in the art. Hence it is intended to be limited not only to the specific structures shown and described, but by the spirit and scope of the following claims.

What is claimed is:

1. A foldable double-surfaced cutting board comprising, in combination, two substantially identical parts, resilient means contained within said two parts for biasing said parts into contact with each other and together with said parts forming a hinge, an external pair of portions of said parts being contiguous along lines adjacent said hinge for forming a pair of planar opposed cutting board surfaces, said parts being relatively rotatable about the hinge to form troughs of either of said planar surfaces along said contiguous lines of said external portions, and an internal pair of portions of said parts for causing said biasing means to be in close contact with said parts only adjacent said contiguous lines.

2. The structure of claim 1, wherein the means causing close contact of said biasing means with said parts comprises a flexible tube inserted in said portions.

3. The structure of claim 1, and at least one dowel forming part of the hinge to control the path of relative rotation of said parts through a predetermined range of movement.

References Cited in the file of this patent
UNITED STATES PATENTS

| | | |
|---|---|---|
| 306,402 | Johnston | Oct. 14, 1884 |
| 1,658,386 | Mayers | Feb. 7, 1928 |
| 1,688,930 | Hyland | Oct. 23, 1928 |
| 1,776,961 | Vielbig | Sept. 30, 1930 |
| 2,783,833 | Cann | Mar. 5, 1957 |